(12) United States Patent　　(10) Patent No.: US 12,569,908 B2
Salvadori　　(45) Date of Patent: Mar. 10, 2026

(54) PROCESS FOR PRODUCING BLANKS OF RINGS

(71) Applicant: Giuseppe Salvadori, Rosta (IT)

(72) Inventor: Giuseppe Salvadori, Rosta (IT)

( * ) Notice: Subject to any disclaimer, the term of this patent is extended or adjusted under 35 U.S.C. 154(b) by 0 days.

(21) Appl. No.: 18/886,471

(22) Filed: Sep. 16, 2024

(65) Prior Publication Data

US 2025/0001483 A1　　Jan. 2, 2025

Related U.S. Application Data

(62) Division of application No. 17/797,065, filed as application No. PCT/IB2021/050918 on Feb. 4, 2021, now abandoned.

(30) Foreign Application Priority Data

| Feb. 5, 2020 | (IT) | ........................ | 102020000002248 |
| Feb. 5, 2020 | (IT) | ........................ | 102020000002260 |
| Feb. 5, 2020 | (IT) | ........................ | 102020000002269 |

(51) Int. Cl.
　*B21K 1/04*　(2006.01)
　*F16C 33/64*　(2006.01)

(52) U.S. Cl.
　CPC ................ *B21K 1/04* (2013.01); *F16C 33/64* (2013.01)

(58) Field of Classification Search
　CPC ................................... B21K 1/04; B21J 9/022
　See application file for complete search history.

(56) References Cited

U.S. PATENT DOCUMENTS 3,199,324 A * 8/1965 Marti ...................... B21C 23/20
　　　　　　　　　　　　　　　　　　　　72/272
3,769,671 A * 11/1973 Knapp .................. B23P 15/003
　　　　　　　　　　　　　　　　　　　　29/DIG. 26

(Continued)

FOREIGN PATENT DOCUMENTS

| JP | H05-169178 A | 7/1993 |
| JP | H06-170483 A | 6/1994 |

(Continued)

OTHER PUBLICATIONS

William Holyoak, Basic Tube cut-to-length methods, TubeNet, Screen shot taken on Aug. 20, 2008, available at http://www.tubenet.org.uk/technical/bill_cutting.html (Year: 2008).*

(Continued)

*Primary Examiner* — Kyle A Cook
(74) *Attorney, Agent, or Firm* — Nixon & Vanderhye P.C.; Lars H. Genieser

(57) ABSTRACT

A process for producing bearing ring blanks, or gearwheel ring blanks, or tubular connection-member blanks, comprises the steps of:
　a) providing a steel tube;
　b) dividing the tube into a plurality of slugs each having an axial through cavity;
　c) supplying the slugs to a die assembly of a cold-forming station, the forming station including a punch assembly; and
　d) subjecting the slugs to contained forward extrusion through the die assembly, wherein the thrust imparted by a pushing member of the punch assembly on a subsequent slug causes passage of a preceding slug through the die assembly, with deformation thereof into a blank, while a restraining member of the punch (Continued)

assembly occupies the axial cavity of the subsequent slug and at least part of the axial cavity of the preceding slug.

13 Claims, 9 Drawing Sheets

(56) References Cited

U.S. PATENT DOCUMENTS

| | | | | |
|---|---|---|---|---|
| 3,837,205 A | * | 9/1974 | Simon | B21K 1/06 |
| | | | | 72/260 |
| 4,653,305 A | * | 3/1987 | Kanamaru | B21C 35/02 |
| | | | | 72/264 |
| 5,069,080 A | * | 12/1991 | Simon | B62D 3/126 |
| | | | | 74/498 |
| 5,408,857 A | * | 4/1995 | Fuhrman | B21K 1/30 |
| | | | | 29/893.34 |
| 6,086,819 A | * | 7/2000 | Commandeur | C22F 1/043 |
| | | | | 419/48 |

| | | | | |
|---|---|---|---|---|
| 2007/0051156 A1 | * | 3/2007 | Adachi | B21J 5/02 |
| | | | | 72/355.4 |
| 2009/0257701 A1 | * | 10/2009 | Maeda | F16C 19/364 |
| | | | | 29/898.04 |
| 2012/0210765 A1 | * | 8/2012 | Nakamizo | F16C 33/64 |
| | | | | 72/352 |
| 2016/0146250 A1 | * | 5/2016 | Thumm | B21D 17/02 |
| | | | | 29/898.03 |

FOREIGN PATENT DOCUMENTS

| | | |
|---|---|---|
| JP | H10-166028 A | 6/1998 |
| KR | 2015-0011866 A | 2/2015 |
| WO | 2017/002770 A1 | 1/2017 |
| WO | 2018/061191 A1 | 4/2018 |

OTHER PUBLICATIONS

Office Action dated Nov. 28, 2024, issued in Japan Patent Application No. 2022-547268, 7 pages.

* cited by examiner

Fig. 2bis
Fig. 3bis
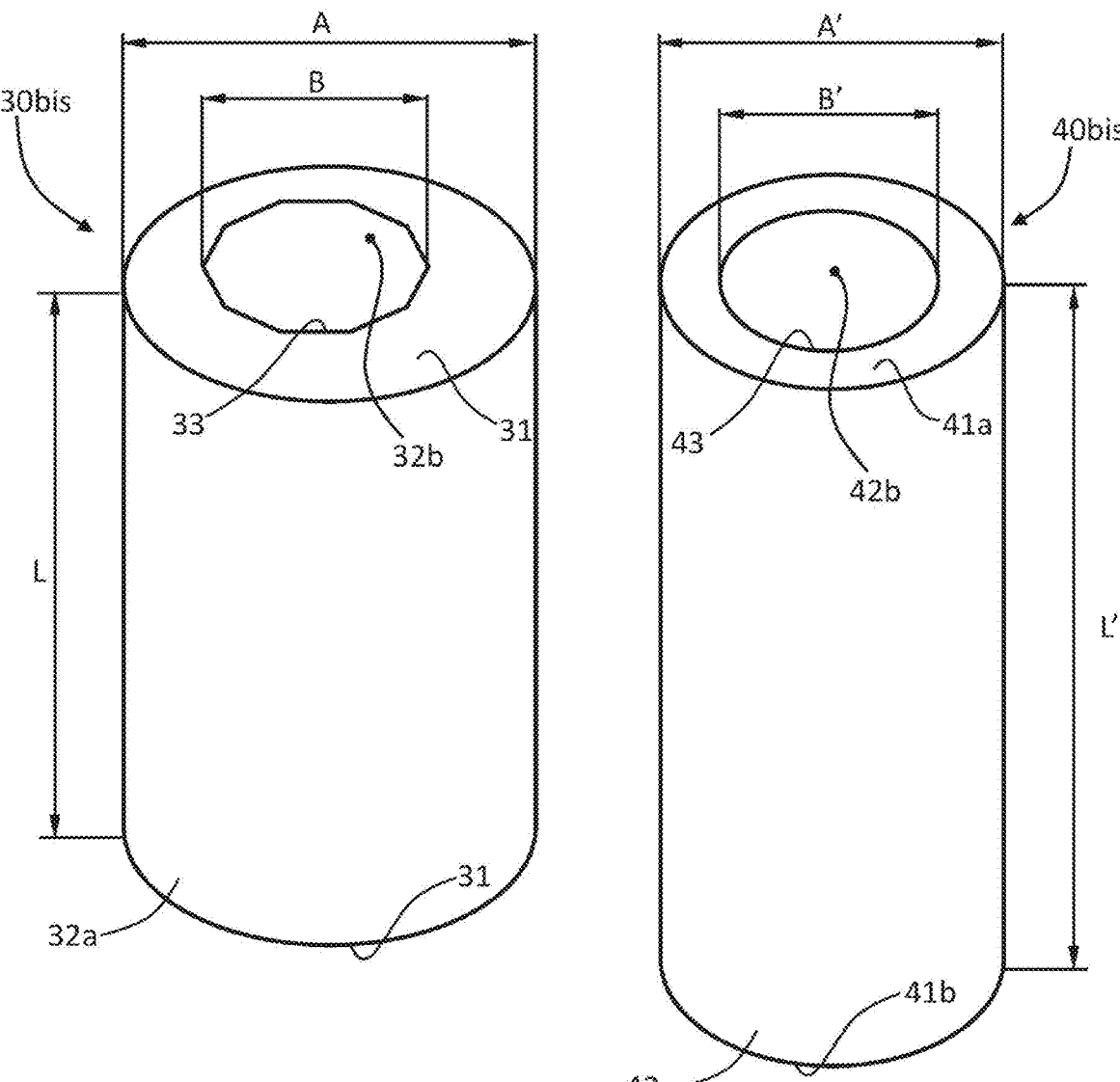

Fig. 17
Fig. 16
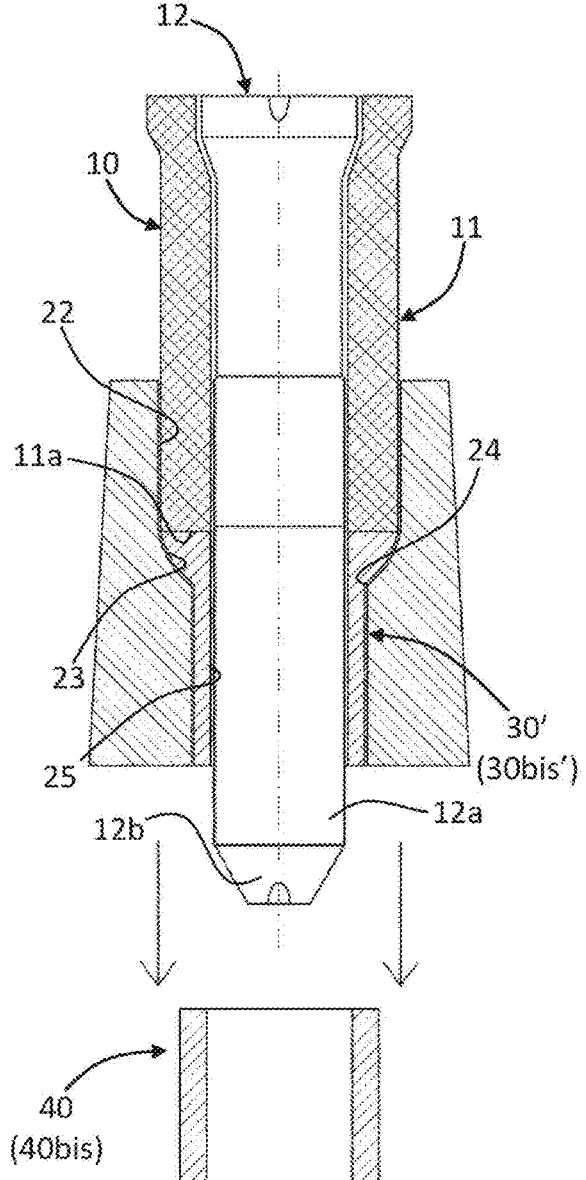
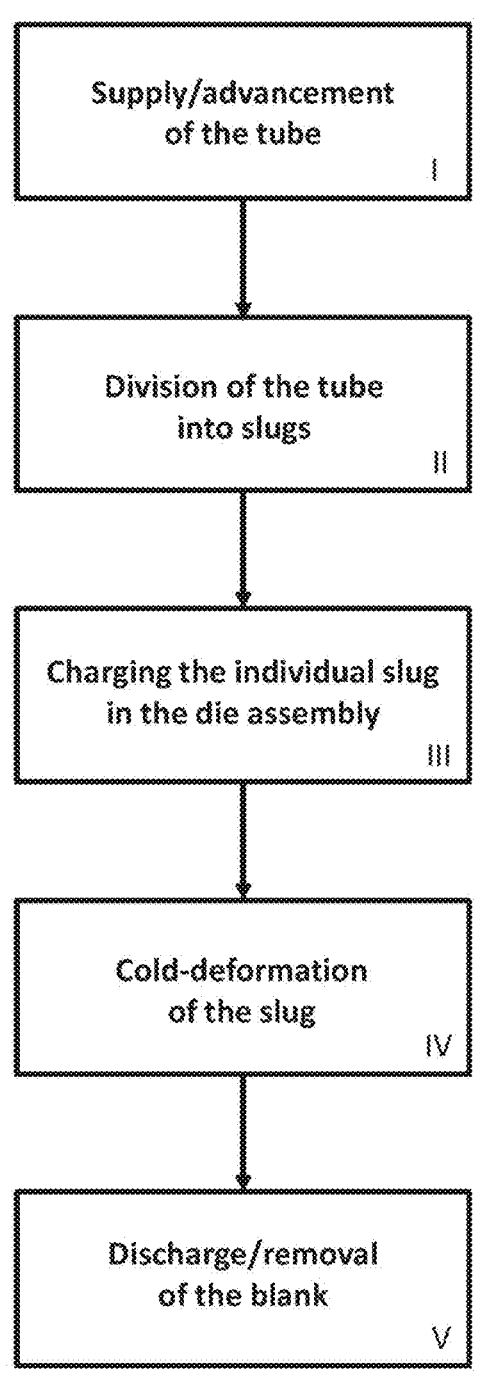

PROCESS FOR PRODUCING BLANKS OF RINGS

CROSS-REFERENCE TO RELATED APPLICATIONS

This application is a divisional application of U.S. patent application Ser. No. 17/797,065 filed 2 Aug. 2022, which is the U.S. national phase of International Application No. PCT/IB2021/050918 filed 4 Feb. 2021 which designated the U.S. and claims priority to IT Patents Applications Nos. 102020000002248, 102020000002260 and 102020000002269, all filed 5 Feb. 2020, the entire contents of each of which are hereby incorporated by reference.

FIELD OF THE INVENTION

The present invention relates in general to the production of annular or tubular members.

In a first aspect, the invention relates to the production of components of rolling bearings, and has been developed with particular reference to the production of steel blanks, to be used for obtaining inner and/or outer rings for bearings.

In a second aspect, the invention relates to the production of components of gears and the like, and has been developed with particular reference to the production of steel ring blanks, to be used for obtaining gearwheels.

In a third aspect, the invention relates to the production of connection components for mechanical members and has been developed with particular reference to the production of steel blanks, to be used for obtaining piston pins and bushings in general, in particular bushings for catenaries and bushings for vibration dampers (such as silent blocks).

PRIOR ART

Rings for bearing are usually obtained by means of hot forging operations, starting from a piece of full (solid) steel. Basically, the starting piece is hot-drilled, in order to define an axially hollow cylindrical semi-finished product, which is subsequently subjected to other corking operations, such as mechanical machining for removal of material, track formation, heat treatment, grinding. This working technique allows for obtaining rings having good mechanical and operational characteristics, but involves high material scraps. Productivity of the machines used for hot-forging is reduced and the related depreciation management costs are very high. Similar problems exist in the case of bearing rings obtained by traditional turning.

Similarly, ring blanks for toothed wheels are usually obtained by means of hot-forging operations, starting from a full piece of steel. Basically, the starting piece is hot-drilled, in order to define an axially hollow cylindrical semi-finished product, i.e., a ring blank, which is subsequently subjected to other working operations, such as mechanical machining of removal of material, formation of the teeth, heat treatment, grinding. This working technique allows obtaining rings having good mechanical and operational characteristics, but involves high material scraps. The productivity of the machines used for hot-forging is reduced and the related depreciation management costs are very high. Similar problems exist in the case of blanks of gears obtained by traditional turning.

Mechanical connection members, such as piston pins or bushings for catenaries or for vibration dampers, are distinguished by a longitudinally extended body provided with an axial through hole. Piston pins are usually produced starting from a cylindrical piece of full steel, which is bored axially via turning operations or forging operations. The bushings for catenaries or for vibration dampers can be produced with a similar technique, or else by turning directly a tube of adequate diameter. The corresponding blanks are then subjected to other machining operations, such as machining operations with removal of stock, end facing, thermal treatment, grinding.

The above machining techniques enable tubular components to be obtained that have good mechanical and operating characteristics, but entail large amounts of swarf. The productivity of the machines employed for turning operations is very low, whereas forging techniques can be applied only to components of small diameter (indicatively up to 30 mm of outer diameter).

AIM AND SUMMARY OF THE INVENTION

The present invention has basically the aim of overcoming the drawbacks referred to above and in particular to provide a process and an apparatus that make it possible to obtain components selected from among steel ring blanks for rolling bearing, steel ring blanks for gearwheels and blanks of tubular mechanical-connection members made of steel, in particular piston pins and bushings for catenaries or vibration dampers, that present good characteristics of geometrical precision and reliability, and that moreover can be produced at considerably lower costs as compared to the prior art referred to.

This and other aims still, which will emerge hereinafter, are obtained according to the invention by processes and an apparatuses that present the characteristics referred to in the annexed claims, which form an integral part of the technical teaching provided herein in relation to the invention.

In summary, the idea underlying the invention is to produce blanks for rolling bearing rings, or blanks for gearwheel rings, or blanks of tubular connection-member blanks by cold deformation of cylindrical pieces, which are in turn obtained via simple division into slugs of a starting tube, in particular a tube obtained by hot-rolling. In preferential embodiments, cold deformation of the aforesaid slugs is obtained using a particular technique of contained forward extrusion of pieces of tubular shape.

For this purpose, preferentially the slugs obtained by dividing the starting tube are supplied to a die assembly of a cold-forming station. In this station, the slugs are subjected to a contained forward extrusion, forcing them through the die assembly via a punch assembly. The thrust imparted by a pushing member of the punch assembly on a subsequent slug causes passage of a preceding slug through the die assembly and its corresponding deformation into a blank of a ring or a tubular member, while a restraining member of the aforesaid punch assembly occupies the axial cavity of the subsequent slug and at least part of the axial cavity of the preceding slug.

A substantial advantage of the invention is represented by the fact that the starting semi-finished product, from which the slugs are obtained, is constituted by a simple tube, which does not need to have very precise geometrical dimensions; i.e., it can be produced with ample tolerances. In this perspective, the processes and apparatuses according to the invention advantageously enable the use of steel tubes obtained via hot-rolling, which are typically distinguished by imprecisions in the definition of the corresponding outer and inner diameters and by a lack of concentricity between the aforesaid diameters.

A further substantial advantage of the invention is represented by the considerable productivity afforded by cold deformation of the material, i.e., the possibility of obtaining in short times large amounts of machined pieces, added to which are major savings in terms of equipment. On the one hand, the equipment necessary is minimal (a punch assembly and a die assembly), and on the other hand the wear of such equipment is very limited in time.

A further important advantage of the invention resides in that it allows cold-deformation of steels which are traditionally considered unsuitable for such a type of cold working: this is typically the case of bearing steels, and in particular the 100Cr6 steel.

A further important advantage of the invention resides in that it allows obtaining via a cold working rings having a large outer diameter and a large thickness, normally obtainable with hot-forging techniques.

A further important advantage of the invention is that of enabling tubular member blanks that have a large outer diameter and/or a large thickness to be obtained via cold-forming.

The blanks that can be obtained by means of the invention are distinguished by a sturdiness comparatively higher than that of similar pieces that can be obtained using traditional methods, also by virtue of the fact that the type of processing proposed allows obtaining an optimal internal structure of the material.

The geometrical precision of the ring blanks and/or of the tubular member blanks that can be obtained according to the invention is, in any case, very high on both of the diameters of the final blank, and this enables a considerable reduction of the subsequent machining operations. Likewise important savings of material (raw material and elimination of rejects) are achieved.

BRIEF DESCRIPTION OF THE DRAWINGS

Further aims, characteristics, and advantages of the invention will emerge clearly from the ensuing detailed description, with reference to the annexed drawings, which are provided purely by way of non-limiting example and in which:

FIG. 2bis is a perspective view of a steel tubular slug, used as starting piece for the purposes of obtaining a tubular member blank according to possible embodiments;

FIG. 3bis is a perspective view of a steel tubular member blank that can be obtained according to possible embodiments;

FIGS. 10-16 are schematic cross-sectional views that illustrate a possible succession of operating steps envisaged for the production of a blank of a ring or a tubular member according to possible embodiments; and FIG. 17 is a simplified block diagram that illustrates a possible sequence of operations aimed at obtaining a blank of a ring or a tubular member according to 15 possible embodiments.

DESCRIPTION OF PREFERRED EMBODIMENTS

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", "in various embodiments", "according to possible embodiments", and the like, that may be present in various points of this description do not necessarily refer to one and the same embodiment. Moreover, particular conformations, structures, or characteristics defined in this description may be combined in any adequate way in one or more embodiments, including ones different from the ones represented. The reference numbers and spatial references (such as "upper", "lower", "top", "bottom", etc.) used herein are provided only for convenience and hence do not define the sphere of protection or the scope of the embodiments. In the figures the same reference numbers are used to designate elements that are similar or technically equivalent to one another.

In the present description and in the ensuing claims, except where otherwise specified or where it is evident from the context:

terms such as "blank", "ring blank", "gear ring blank", "tubular member 35 blank", and the like are intended to indicate each a cylindrical semi-finished product component that has substantially defined dimensions, can be obtained via the apparatus and the process according to the invention, and is to be subsequently finished or machined with modalities in themselves known in order to obtain an inner or outer ring of a rolling bearing, or a semi-finished ring designed to subsequently machined for the purpose of obtaining a gearwheel, or a tubular member, such as a piston pin, or a bushing for catenaries, or a bushing for vibration dampers;

terms such as "tube slug", "tubular slug", "annular slug", and the like are intended to indicate a substantially cylindrical and axially hollow tubular body, for example obtained via shearing of a starting tube and not necessarily subjected to finishing machining operations prior to use, as envisaged according to the invention;

the term "tube" is intended to indicate a substantially cylindrical and axially hollow body, not necessarily finished, which can be sheared or cut into slugs; and the term "press" is intended to indicate an operating machine designed for compression of a material being machined, capable of developing high pressures on the material in order to deform it and impart thereon a desired shape.

Figure 1:
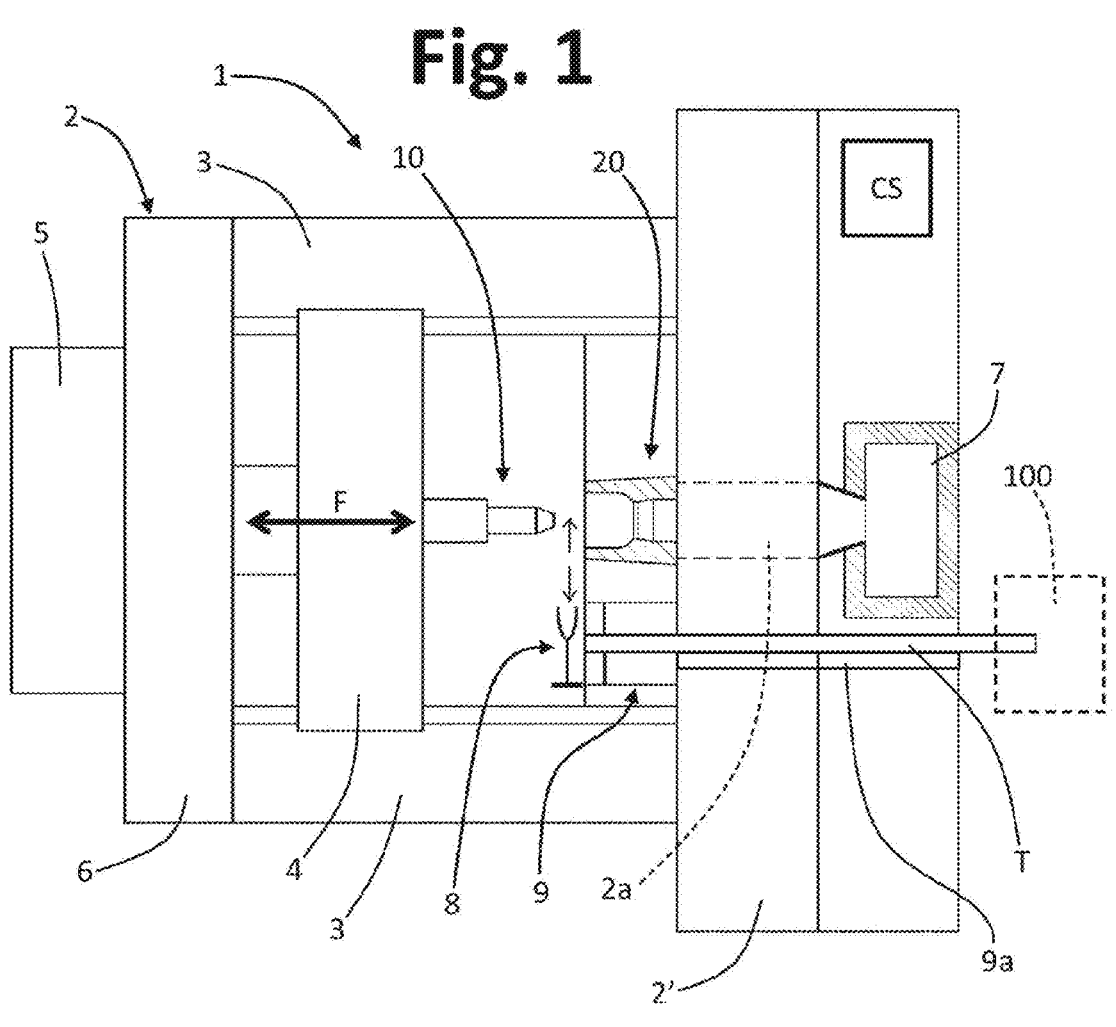
FIG. 1 is a partial and schematic representation of an apparatus for cold-forming of blanks of rolling-bearing rings, or blanks of gearwheels, or blanks of tubular member blanks, according to possible embodiments.

Represented schematically in FIG. 1 is an apparatus that can be used in the production of rolling bearing rings, or gearwheel rings, or tubular connection members, such as piston pins and bushings, according to the teachings of the present invention. In particular, the apparatus, designated as a whole by 1, is used for obtaining blanks of rings or tubular member. In the case exemplified, the apparatus 1 comprises at least one forming station. In preferred embodiments, the apparatus further comprises at least one station for dividing a tube into slugs, preferably via shearing. In particularly advantageous embodiments, the apparatus 1 includes one or more accessory systems selected from the following:

a transfer system, for transfer of slugs to the forming
        station;
    a system for loading tubes;
    a feeding system for feeding a tube to the possible
        shearing station; and
    a discharge system for removal of the blanks from the
        apparatus.

In some embodiments, the apparatus 1 has a supply arrangement (8, 9) for supplying steel tubular slugs (30, 30'; 30bis, 30bis'), in particular slugs each having an axial through hole (33) and an outer peripheral surface (32), the supply arrangement (8, 9) being prearranged for supplying in an automated way to the cold-forming station (2) one said tubular slug (30, 30'; 30bis, 30bis') in a position corresponding to the axial cavity (21) of the die assembly (20).

The supply arrangement comprises a separation station (9), prearranged for dividing a tube (T) into a plurality of said tubular slugs (30, 30'; 30bis, 30bis'), the separation station (9) being preferably selected from among a bench-shearing station, a cutting station, a shearing station.

The supply arrangement comprises a transfer system (8), for positioning individually each tubular slug (30, 30'; 30bis, 30bis') in said position corresponding to the axial cavity (21) of the die assembly (20). The transfer system (8) is prearranged for picking up one said tubular slug (30, 30'; 30bis, 30bis') exiting said separation station (9) and transferring it into said position corresponding to the axial cavity (21) of the die assembly (20), in a way synchronized with actuation of the actuation system (3-5) of the cold-forming station (2).

The supply arrangement comprises a feeding system (9a), prearranged for advancing the tube (T) towards the separation station (9).

In the case exemplified, at least the aforesaid forming station is implemented on a press 2, which has a general structure that is as a whole known, except for parts defined hereinafter as "punch assembly" and "die assembly", designated as a whole by 10 and 20, respectively, in FIG. 1 and that form part of the specific object of the invention.

The assemblies 10 and 20, which will be described in detail with reference to FIGS. 4-8 and 9, respectively, are mounted on the press 2 in positions substantially coaxial to one another, preferentially one on a movable part and the other on the fixed part of the press 2. In the example, the press 2 is a horizontal press, but nothing in principle rules out the use of a vertical press in other embodiments.

In the example represented, the press 2 comprises a load-bearing structure, designated as a whole by 2', which supports guides 3, along which a slide or ram 4 is slidably mounted. The slide 4 can be translated with reciprocating motion, as indicated by the arrow F, via an actuation assembly 5, for example carried by a cross member 6 of the fixed structure of the press 2. The actuation assembly 5 may be of any known type (for example, a piston-driven hydraulic actuation assembly or else a cam-driven mechanical actuation assembly), suited to generating a sufficient closing force between the assemblies 10 and 20, indicatively comprised between 50 and 500 tonnes. In the example, associated in a fixed way to the slide 4 is the aforesaid punch assembly 10, whereas associated to the structure 2' is the die assembly 20, so as to be able to obtain a relative movement between the two assemblies in question.

Preferentially, defined underneath the die assembly 20 in the structure 2' is a passage 2a, through which the blanks obtained by machining on the press 2 can reach a removal or discharge area 7. The removal area 7 may form part of a discharge system, preferably provided with a conveyor suitable for transferring the blanks for subsequent machining operations, for example operations of turning, and/or thermal treatment, and/or grinding, and/or surface finishing.

As has been said, the apparatus 1 may include a manipulator system. In the case exemplified in FIG. 1, associated to the press 2 is a transfer system 8, synchronised with the movements of the slide 4, which is built in a way in itself known to the persons skilled in the sector, which include means prearranged for positioning in an automated way the starting rough pieces to be machined in a position corresponding to the die assembly 20.

In various embodiments, the apparatus 1 is equipped with a control system CS prearranged for managing in a synchronized way at least actuation of the press 2, i.e., of its actuator assembly 5, and of the transfer system 8. In various preferential embodiments, the aforesaid control system CS likewise manages one or more further stations or accessory systems of the press 2, selected from the ones referred to previously.

For example, with reference once again to FIG. 1, designated by 9 is a separation station, for division into slugs of a metal tube T coming from a loading system, designated as a whole by 100, where this station 9 and this system 100 can be built according to techniques known to persons skilled in the sector. The tube slugs obtained in the station 9 constitute the starting rough pieces for working to be carried out using the assemblies 10 and 20.

In various embodiments, the station 100 thus supplies the starting tubes T, for example via a feeding system 9a of a conception in itself known, with each tube that is divided in the station 9 according to modalities in themselves known, for example sheared by means of a movable shear/fixed shear system, in order to obtain tubular slugs that have substantially the same dimensions (i.e., outer diameter and inner diameter) as the starting tube T. Via the manipulator or transfer system 8, the aforesaid slugs are positioned individually in a position corresponding to the die assembly 20.

Irrespective of the modalities with which the individual slug is positioned in the die assembly 20, actuation of the press 2, and hence closing of the punch assembly 10 on the die assembly 20, enables a blank of a bearing ring, or of a gearwheel ring, or of a tubular member, that has well-defined geometrical dimensions to be obtained via a significant reduction of area of the starting slug.

Figure 2:
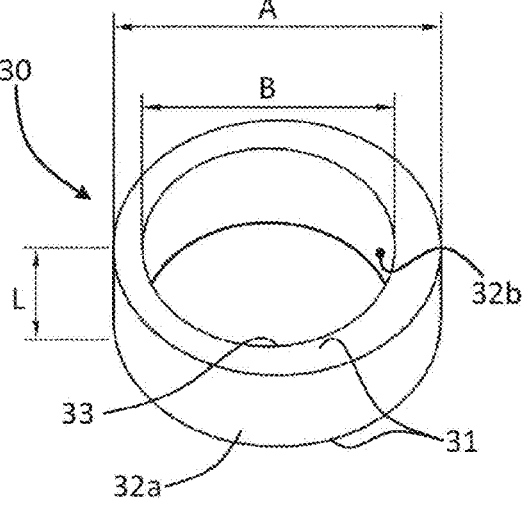
FIG. 2 is a perspective view of a steel tubular slug, used as starting piece for the purposes of obtaining a ring blank according to possible embodiments.

Represented schematically in FIG. 2 is an example of a starting rough piece that is to be processed on the press 2, for the purpose of obtaining a ring blanks for a bearing or a gearwheel, whereas in FIG. 2bis there is represented schematically an example of a starting rough piece that is to be processed on the press 2, for the purpose of obtaining a tubular member blank. As already mentioned, the piece in question, designated as a whole by 30 or 30bis, is basically constituted by a tubular or annular slug of metal material, in particular steel. The slug 30 or 30bis consists of a substantially cylindrical body having two substantially circular end faces 31 and a peripheral or outer circumferential surface 32a. The body of the slug 30 or 30bis is traversed axially by a cavity 33, which thus defines also a peripheral or inner circumferential surface 32b. The outer diameter A and the inner diameter B of the slug 30 or 30bis—i.e., the diameters of the walls 32a and 32b—are substantially pre-determined, even though they may be irregular and present ample tolerances. The slug 30bis of FIG. 2bis, used for obtaining tubular member blanks, has a greater axial dimension L, with respect to the slog 30 used for obtaining ring blanks.

In this regard, it should be noted that the body of the tubular slugs 30 or 30bis is preferably obtained via shearing of a starting tube, formed according to techniques in themselves known. Preferentially, the tube is formed via hot-rolling, which is a consolidated and relatively inexpensive technique suitable for working steels used for the purposes of implementation of the invention.

Whereas the end faces 31 of the slug 30 or 30bis are substantially flat and mutually parallel following upon division of the tube T, its inner diameter B may be somewhat irregular. This irregularity may be due either to deformations caused by the shearing process or to the fact that the process of hot-rolling does not enable a precise and regular starting tube to be obtained, in particular as regards its thickness: for this reason, a slug 30 or 30bis may present significant errors of shape and concentricity between the circumferences identified by the outer diameter A and by the inner diameter B, as exemplified in FIG. 2 or in FIG. 2bis. However, the apparatus and the process according to the invention advantageously enable use of even relatively irregular tubular slugs, namely, ones that do not necessarily call for preliminary machining operations of finishing.

In various preferential embodiments, the starting tube T from which the slug 30 for the bearing ring blanks are obtained is formed with a steel having high resistance to cold deformation, in particular a tensile strength not lower than about 65 Kg/mm². Steels particularly suitable for the purpose of implementing the invention are those belonging to the family of bearing steels, such as annealed 100Cr6 steel. Obviously it is possible to use other metallic materials for obtaining the starting tube, and hence the slogs 30, provided that the material used for bearing rings presents a good mechanical strength, wear resistance, and resistance to impact and corrosion, as well as guaranteeing a good dimensional stability.

In various preferred embodiments, the starting tube T from which the slogs 30 are obtained for obtaining blanks of gearwheel rings is formed with a steel having a tensile strength of not less than about 50 Kg/mm². Steels particularly suitable for the implementation of the invention are those belonging to the family of case-hardening steels, such as 16MnCr5 steel or 20MnCr5 steel. Obviously it is possible to use other metallic materials for obtaining the starting tube, and hence the slogs 30, provided that the material used for gearwheel rings presents a good mechanical strength, wear resistance, resistance to impacts and corrosion, as well as guaranteeing a good dimensional stability.

In various preferential embodiments, the starting tube T from which the slugs 30bis are obtained is made of a steel that has a tensile strength not lower than approximately 50 kg/mm². Steels that are particularly indicated for the purposes of implementation of the invention are the ones belonging to the family of case-hardening steels (for example, 16MnCr5 for piston pins), steels suitable for induction hardening (for bushings for catenaries), and low-alloy steels (for bushings for vibration dampers). Obviously, the use of other metal materials is possible for the production of the starting tube, and hence of the slugs 30bis, provided that the material used for tubular connection members of the type referred to presents a good mechanical strength, wear resistance, and resistance to impact, as well as guaranteeing a good dimensional stability.

Figure 3:
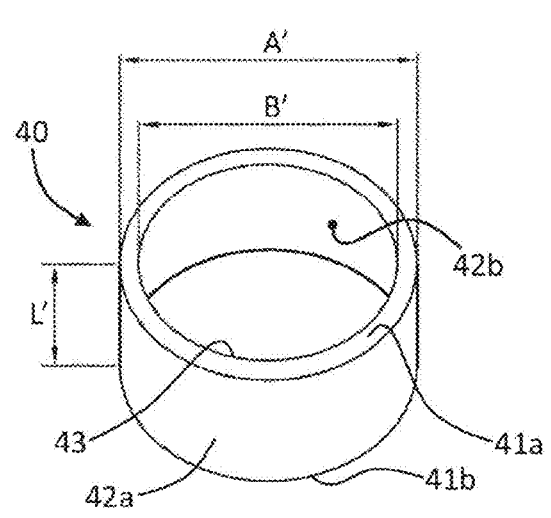
FIG. 3 is a perspective view of a steel ring blank that can be obtained according to possible embodiments.

Represented schematically in FIG. 3 is an example of a blank of a bearing ring or of a gearwheel ring that can be obtained in accordance with the invention, designated by 40, whereas in FIG. 3bis is represented schematically an example of a blank of a tubular connection member that can be obtained according to the invention, designated by 40bis, which here should be assumed as being a piston pin, or a bushing for a catenary, or a bushing for a vibration dumper (for example, of a silent-block type).

The blank 40 or 40bis, which can then be finished according to known technique, may be obtained starting from a tubular slug of the type designated previously by 30 or 30bis, respectively.

The blank 40 or 40bis has two opposite end faces, designated by 41a and 41b, a peripheral or outer circumferential surface 42a of diameter A' and a peripheral or inner circumferential surface 42b of diameter B'. Also the blank 40 or 40bis, like the starting slug 30 or 30bis, respectively, is traversed axially by a cavity 43, which in this case is defined with a sufficiently high precision thanks to the process according to the invention. Unlike the slug 30 or 30bis, in fact, the blank 40 or 40bis has definite and precise diametral dimensions, with a precise concentricity of the circumferences identified by the diameters A' and B', as a result of the particular process of deformation described hereinafter.

In general terms, the outer diameter A' of the blank 40 or 40bis is well-defined and is considerably smaller than the outer diameter A of the corresponding starting slug 30 or 30bis; on the other hand, the inner diameter B' of the blank 40 or 40bis is smaller than the inner diameter B of the corresponding slug 30 or 30bis, even though preferentially the dimensional difference between the diameters B and B' is less than the dimensional difference between the diameters A and A'. On account of the process of cold deformation envisaged according to the invention, moreover, the blank 40 or 40bis has an axial dimension L' greater than the axial dimension L of the corresponding tubular starting slug 30 or 30bis, respectively.

As is will be seen also hereinafter, the end face 41a of the blank 40 or 40bis, here conventionally defined as "upper face", has a slightly concave surface (by some tenths of a millimetre, for example 5-15 tenths), whereas the end face 41b, here conventionally defined as "lower face" has a slightly convex surface (by some tenths of a millimetre, for example 5-10 tenths).

As previously mentioned, the idea underlying the present invention is that of obtaining a blank starting from a tubular slug, imparting on the latter a significant reduction of area (namely, of the area of the annulus defined by the diameters A-B as compared to the annulus defined by the diameters A'-B'). According to the invention, this reduction of area is obtained via a particular cold-deformation technique, here defined as "contained forward extrusion of pieces of tubular shape". The reduction of area that can be obtained according to the invention, using, for example, bearing steels is indicatively comprised between 20% and 40%, whereas with case-hardening steels is indicatively comprised between 20% and 50%.

In the traditional contained forward extrusion (known by the terms "contained forward extrusion", or "trapped forward extrusion", or "closed-die forward extrusion") a full metal piece is partially forced, via a thrust bushing, in an orifice of a die that has a stretch of a diameter smaller than the starting diameter. The aforesaid piece is totally contained in the die before extrusion takes place. The final piece has an increased overall length, with the deformed part that has a smaller diameter. Contained forward extrusion, which in general enables major reductions of area of the starting piece to be obtained, even of up to 70% for suitable materials, is typically used for obtaining full components that have axial portions of considerably different diameters, connected together by a radius surface. On the other hand, forward extrusion of pieces of a tubular shape is a technique of extrusion of a starting piece that has an axial cavity, into which a punch is inserted, from the same direction as that in which the starting piece is set in the die, with the punch that is to contain the inner diameter of the extruded part, at the moment when forward extrusion is carried out, and where a bushing of the punch assembly pushes the piece out of the die.

On the other hand, the technique of contained forward extrusion of pieces of a tubular shape, proposed according to the invention, envisages the machining of non-full starting pieces, namely, tubular pieces, and envisages that a tubular piece being machined pushes a previous tubular piece through an area-reducing region and a forming region of a die assembly.

In various preferential embodiments, the starting tube T is subjected to a phosphating process prior to division into slugs 30 or 30*bis*; alternatively, for example when division of the tube into slugs is carried out on a purposely designed apparatus separate from the press 2, it may possibly be the slugs 30 that have to undergo such a process, after division of the tube. The phosphating process renders the slugs suitable for the subsequent process of cold deformation.

FIGS. 4-8 represent, in different views, examples of die assemblies 20 according to the invention.

In the cases exemplified, the die assembly 20 is constituted by a single body, but in other embodiments the latter could be formed in at least two pieces set on top of one another, according to the length of the tubular slug that is to undergo deformation or the blank to be obtained. The body or bodies that constitute the die assembly 20 may conveniently be made of a special steel for tools or else of hard metal.

Figures 4, 5:
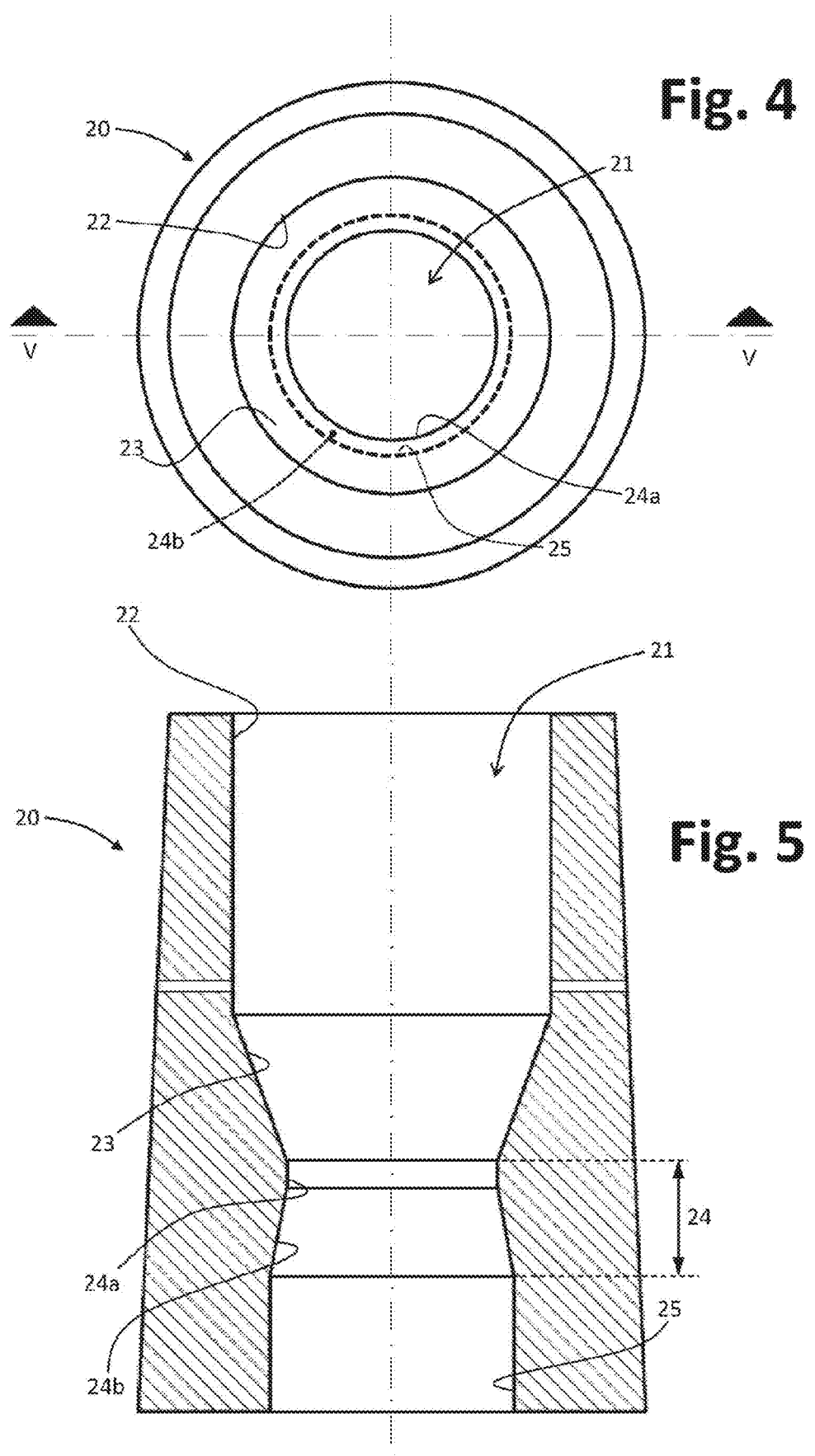
FIG. 4 is a schematic top plan view of a die assembly that can be used for cold-forming of blanks according to possible embodiments.
FIG. 5 is a schematic cross-sectional view of the aforesaid die assembly, according to the line V-V of FIG. 4.
Figure 8:
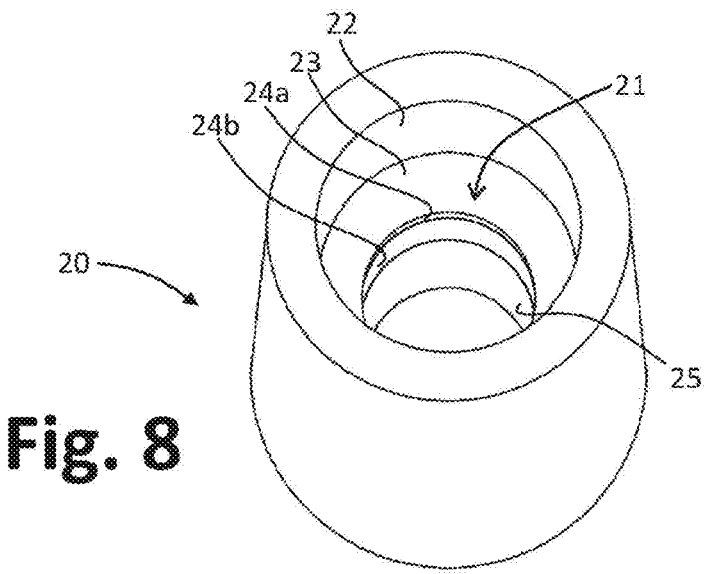
FIG. 8 is a schematic perspective view of a die assembly of the type illustrated in FIGS. 4-5, at a different scale.

With reference, in particular, to FIGS. 4, 5, and 8, the body of the assembly 20 has an axial through cavity 21. The upper part of the cavity 21 forms an axially extended receiving region of the slugs 30 or 30*bis*, designated by 22. This region 22 preferably has a constant circular cross section, with a diameter that is only slightly greater (by some tenths of a millimetre, for example 5-10 tenths) than the outer diameter A of the starting slugs 30 or 30*bis*. This modest dimensional difference between the diameter A and the diameter of the receiving region 22 is aimed at facilitating insertion of a slug 30 or 30*bis* in the same region 22, without, however, leaving excessive space for undesired transverse movements of the material, during pressing of the slug 30 or 30*bis*.

According to an important characteristic of the invention, within the cavity 21, immediately underneath the region 22 for receiving of the slugs 30 or 30*bis*, an area-reducing region 23 is defined, which has a progressively decreasing diameter, followed by a forming region, designated as a whole by 24 in FIG. 5.

Figure 6:
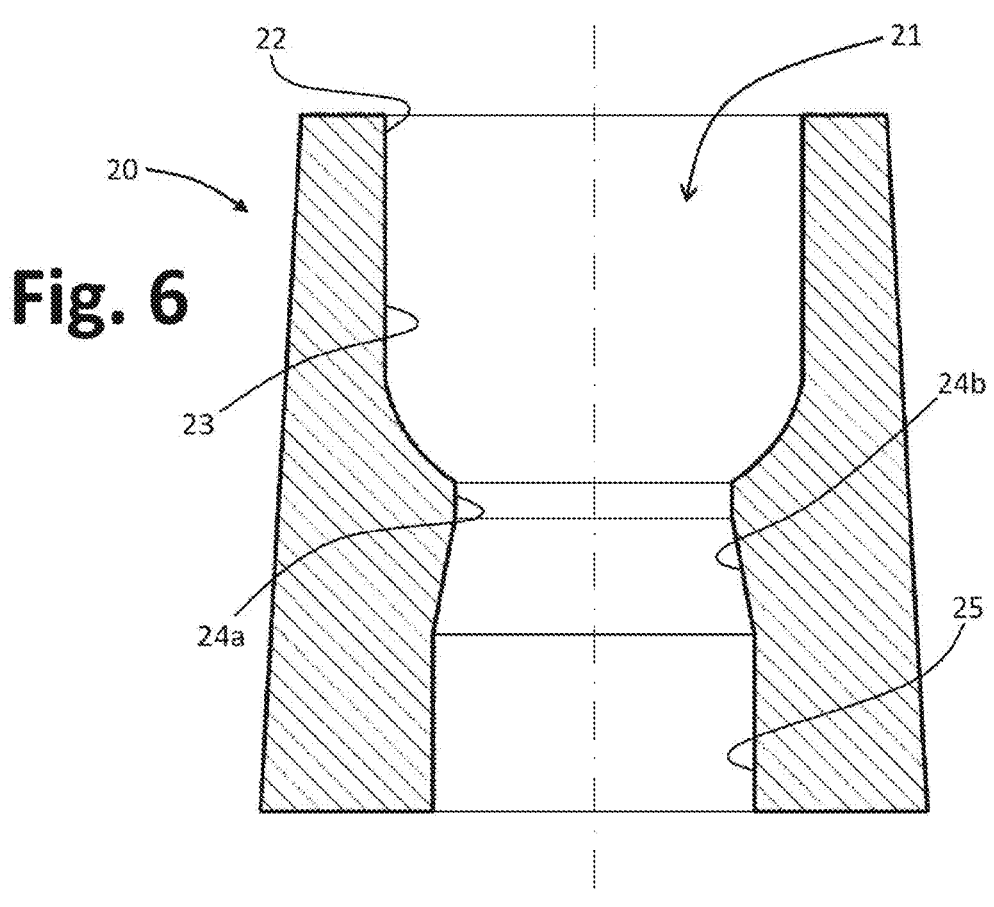
FIGS. 6 and 7 are schematic cross-sectional views, similar to those of FIG. 5, of die assemblies that can be used for cold-forming of blanks according 5 to other possible embodiments.
Figure 7:
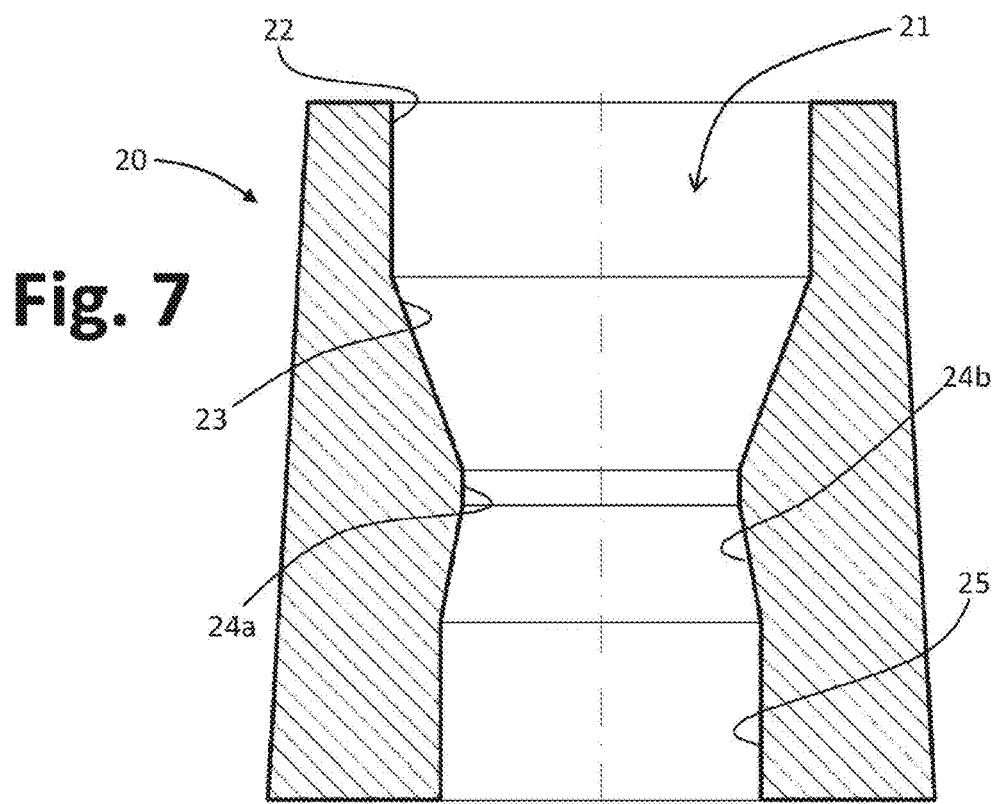

The area-reducing region 23 is basically defined by an annular band of the surface of the cavity 21, which can have a conical profile, as exemplified in FIG. 5, or else a concave curved profile, as exemplified in FIG. 6. In the case of a conical profile, the conicity may be comprised indicatively between 10° and 20°. The possible concave profile may, instead, have a regular radius of curvature, substantially equal to the difference between the diameter of the region 22 and the minimum diameter of the region 23; of course, it is possible to use concave profiles that have radiuses of curvature that are more or less marked according to the characteristics of the blanks of ring or of tubular member to be obtained. In general, hence, the profile of the area-reducing region 23 has a maximum diameter corresponding to the diameter of the receiving region 22 and a minimum diameter corresponding to a minimum diameter of the forming region 24.

In various embodiments, such as the one exemplified in FIG. 5, the die assembly 20 is sized for the purposes of execution of a contained forward extrusion, i.e., it has a receiving region 22 that is sufficiently long to contain entirely the starting slug 30 (or 30*bis*), even before the latter is pressed. In other embodiments, such as the one exemplified in FIG. 7, the assembly 20 is, instead, prearranged for providing an open forward extrusion, or else has a receiving region 22 of reduced length: in this case, pressing is hence obtained with the slug 30 (or 30*bis*) that is not entirely contained in the region 22, but projects at least slightly therefrom. Obviously, a concave profile of the type illustrated in FIG. 6 may be used also in the case of an assembly prearranged for carrying out an open forward extrusion.

As has been said, the area-reducing region 23 is followed by the forming region 24, which has a minimum diameter substantially corresponding to the minimum diameter of the area-reducing region 23 and to the outer diameter A' of the blank 40 or 40*bis*.

In various embodiments, the forming region 24 has a minimum entry diameter and a maximum exit diameter, where the aforesaid minimum entry diameter corresponds to the minimum exit diameter of the area-reducing region 23, and where the maximum exit diameter is comprised between the minimum exit diameter and the maximum entry diameter of the area-reducing region 23.

In various embodiments, the forming region 24 comprises an entry portion 24*a*, of a constant circular section, followed by an exit portion 24*b*, of progressively increasing circular section or conical section.

The entry portion 24*a* has a length of a few millimetres (for example, 1-4 mm), and a diameter substantially equal to the outer diameter A' desired for the blank 40 or 40*bis*. On the other hand, the portion 24*b* is slightly longer (indicatively at least twice the portion 24*a*) and its diameter increases slightly in a regular way, indicatively by 1-2 tenths of a millimetre. It should be noted that in FIGS. 4-8 the dimensions of the portions 24*a* and 24*b* have been deliberately exaggerated, for a more convenient understanding of the drawings.

In operation, the material of a slug 30 or 30*bis*—here a bearing steel or a case-hardening steel—is forced to undergo reduction through the entry portion 24*a* of the region 24 (which substantially operates like a drawplate), and then be allowed to release in the slightly wider portion 24*b*. In this way, the material does not slide significantly on the surface of the portion 24*b*, thus preventing any friction that might cause damage to the blank 40 or 40*bis* as it comes out, and likewise preventing having to increase unnecessarily the thrust required to obtain the blank.

The forming region 24 is preferentially followed by a discharge region 25, preferably of constant circular section that has a diameter substantially corresponding to the maximum exit diameter of the portion 24*b*.

Figure 9:
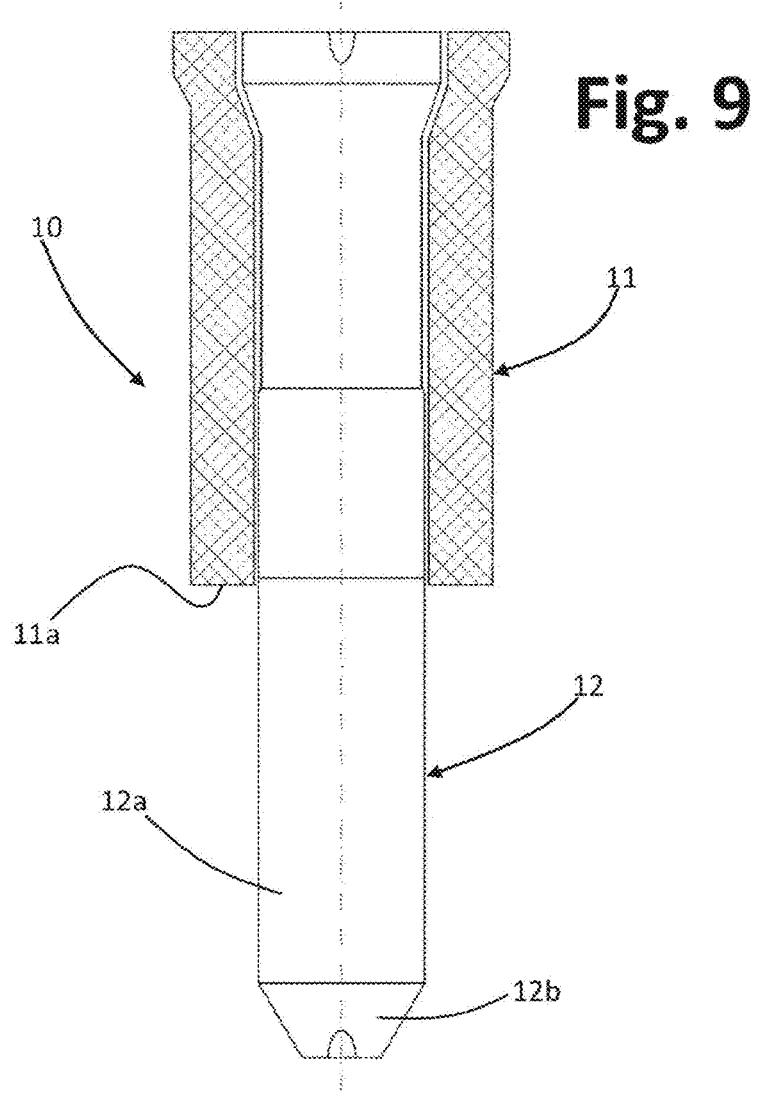
FIG. 9 is a schematic cross-sectional view of a punch assembly that can be used for cold-forming of blanks according to possible embodiments.

Represented schematically in cross-sectional view in FIG. 9 is a punch assembly 10 according to possible embodiments. The assembly 10 comprises a pressing or pushing member, which in the example provided is represented by a cylindrical bushing 11, made, for example, of special steel for tools, which has an end face 11a (here defined conventionally as "lower face") that is substantially flat. The outer diameter of the bushing 11 is slightly smaller (by some tenths of a millimetre, for example 1-5 tenths) than the diameter of the receiving region 22 of the die assembly 20, and is slightly larger (by some tenths of a millimetre, for example 1-5 tenths) than the outer diameter A of the starting slug 30 or 30bis.

The assembly 10 further comprises a shape-restraining, here represented by a punch designated by 12. The punch 12 has an elongated cylindrical body that, in the example represented, is partially housed in the cavity of the bushing 11, coaxially thereto preferably in a relative fixed position with respect thereto (except for the possible provision of an extraction system, for example of the type referred to hereinafter). The body of the punch 12, made, for example, of special steel for tools, has a respective portion 12a that projects axially from the face 11a of the bushing 11 and in use is axially aligned to the cavity 21 of the die assembly 20.

The body portion 12a has a diameter that is smaller (by some millimetres, for example 1-5 mm) than the inner diameter B of the starting slugs 30 or 30bis and substantially equal to the inner diameter B' of the blanks 40 or 40bis, respectively, that are to be obtained; more precisely, the body portion 12a has a diameter that is a few hundredths of a millimetre smaller than the aforesaid diameter B', on account of the elastic response of the steel of the deformed piece.

The diameter of the portion 12a is evaluated considering what is the inner diameter B' of the blank 40 or 40bis that is to be obtained, what is the overall reduction of area that it is desired to bestow upon the slug 30 or 30bis that is to undergo deformation, and the fact that, when there occurs reduction of outer diameter through the regions 23-24 of the die assembly 20, the inner diameter B of the slug 30 or 30bis must rapidly encounter the punch 12 in order to prevent squeezing/collapse in a transverse direction of the steel, hindering proper sliding thereof in an axial direction. Likewise, the dimensions of the various regions of the cavity 21 of the die assembly 20 are chosen according to what is the outer diameter A' of the blank 40 it is desired to obtain and to what is the overall reduction of area that it is desired to bestow upon the slug 30 or 30bis that is to undergo deformation.

In the case exemplified, the portion 12a of the punch 12 terminates with a tip 12b, which is preferably conical to facilitate its insertion into the slugs 30 or 30bis. As mentioned hereinafter, the same portion 12a may have a slightly conical shape, in particular to facilitate extraction of the punch 12 when the assembly 10 is extracted from the die assembly 20 (i.e., when the slide 4 of the press 2 of FIG. 1 moves away from the fixed part 2'): this prevents having necessarily to resort, on the side of the punch, to known synchronized extraction systems (for example, of a timed stripper type, or timed take-out type, or timed knock-out type), which may, however, be envisaged, if necessary.

By way of indication, the body portion 12a may have a length at least equal to the length of the cavity 21 of the assembly 20. More in general, it is sufficient for the length of the body portion 12a to be such that—at the moment when the face 11a of the thrust bushing 11 rests on the upper face of a slug 30 or 30bis housed in the reception area 22 of the die assembly 20—a part of the portion 12a will engage both the area-reducing region 23 and the forming region 24.

As explained previously, in various embodiments the press 2 of FIG. 1 is provided with means 3-5 for translating in a reciprocating way the punch assembly 10 with respect to the die assembly 20. In the mounted condition, the bushing 11 of the assembly 10 is axially aligned to the cavity 21 of the die assembly 20 in such a way that the smaller portion of the bushing 11 and the body portion 12a of the punch 12 may be brought within the cavity 21 of the die assembly 20, and then extracted from the cavity itself.

Represented in FIGS. 10-16 is a possible working sequence of the press 2 that uses assemblies 10 and 20 of the type described previously. It should be noted that in the above figures the assemblies 10 and 20 are arranged vertically only for needs of representation; for the same reason, the assemblies 10 and 20, as well as the slugs 30, 30' and a blank 40, have been represented with reduced lengths. FIGS. 10-16 exemplify the production of a blank of a bearing ring or a gearwheel 40 starting from a slug 30, taking for granted that the production of a blank of a tubular member 40bis starting from a slugs 30bis is carried out in the same ways.

Figure 10:
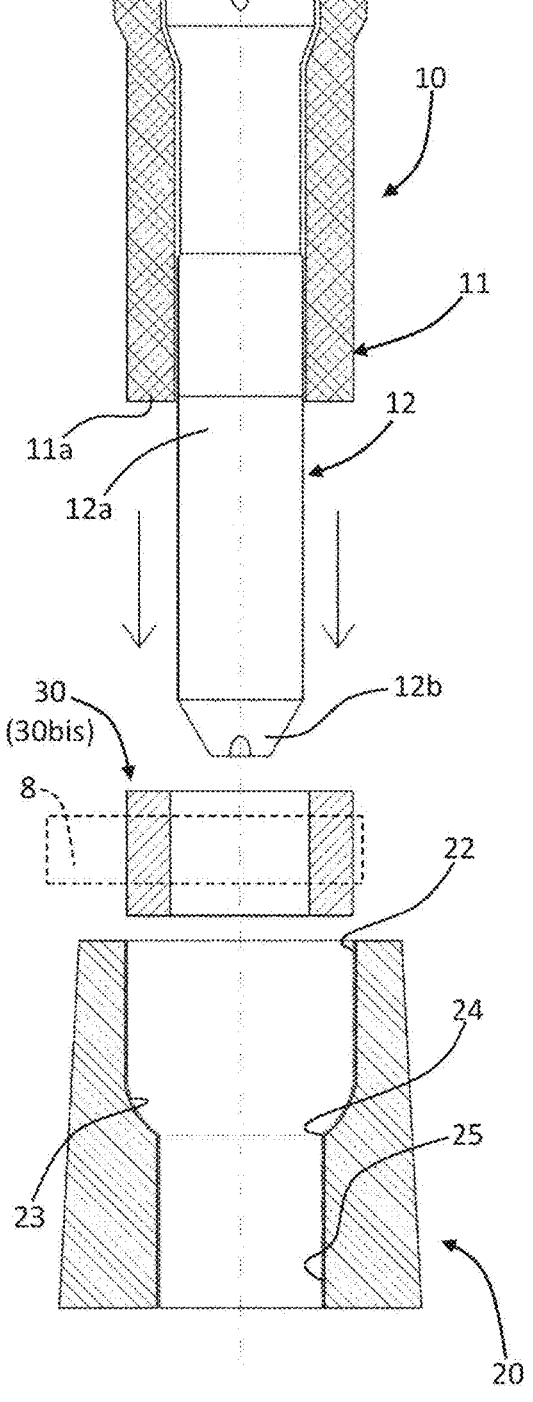
Figure 11:
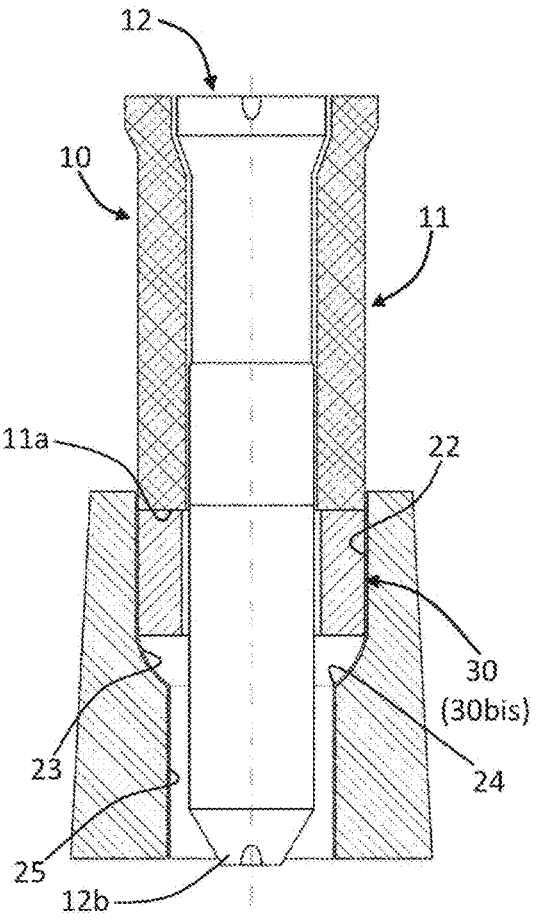

A slug 30 (or 30bis), for example obtained on the station 9 of FIG. 1 by means of shearing of the starting tube T, is transferred by means of the system 8 into a position corresponding to the cavity 21 of the die assembly 20, in particular of its receiving region 22, as represented schematically in FIG. 10, with the slide 4 of the press 2 of FIG. 1 that moves towards the bottom dead centre. When the face 11a of the bushing 11 comes into contact with the upper face of the slug 30 (or 30bis), the manipulator system 8 releases the slug itself, which is pushed into the cavity 21, as illustrated in FIG. 11.

Preferentially, the height of the region 22 is greater than the height L (FIG. 2) of the slug 30 (or 30bis), with the latter that is thus completely contained in the former. As previously explained, in the embodiment illustrated, the area-reducing region 23 is identified by a band with conical surface (FIG. 5 or FIG. 7) or else with concave curved surface (FIG. 6). As has been said, the outer diameter of the slug 30 (or 30bis) is only a little smaller than the diameter of the receiving region 22, to facilitate insertion but at the same time prevent undesired movements of the material of the slug in a transverse direction at the start of pressing, which would hinder the process of contained forward extrusion.

As has been said, the slide 4 of the press 2 of FIG. 1 brings the punch assembly 10 into the die assembly 20. As may be appreciated, the body portion 12a of the punch 12 penetrates into the axial hole of the slug 30 (or 30bis), and the end face 11a of the thrust bushing 11 presses against the upper face of the slug itself, forcing it through the regions 22-24. The movement of the assembly 10 is controlled in such a way that the advancement will be interrupted when the face 11a of the bushing 11 is in a position corresponding to the mouth of the area-reducing region 23, in the position visible in FIG. 12.

Figure 12:
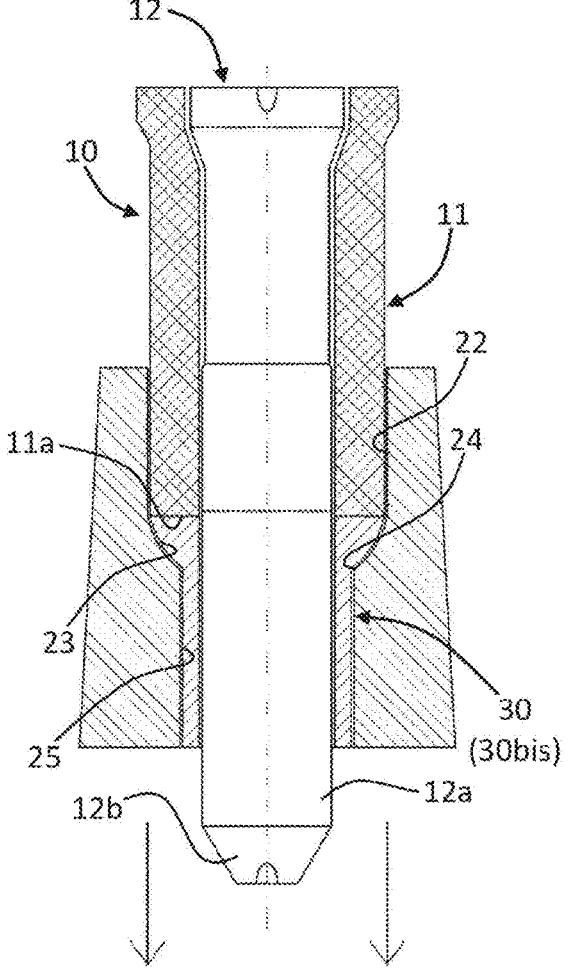

In this way, partial deformation of the slug 30 (or 30bis) is brought about, as may be seen in FIG. 12. In this step, the body portion 12a of the punch 12 prevents radial deformation of the slug 30 (or 30bis) inwards, i.e., a transverse collapse thereof. As has been said, the inner diameter B of the slug 30 (or 30bis) is only slightly larger than the diameter of the punch 12 since the material of the slug, after entering the area-reducing region 23, must rapidly encounter an insurmountable obstacle: the only passageway for this material is thus represented by the regions 23-25 not occupied by the portion 12a of the punch 12: in this way, by occupying these regions, the deformed material can form a piece, the geometrical dimensions of which are very precise even though the starting geometrical dimensions of the slug 30 (or 30bis) are not. As may be noted in FIG. 12, at the end of the axial travel of the assembly 10, a part of the material occupies the region 23, and the remaining part of the material engages the regions 24-25.

Figure 13:
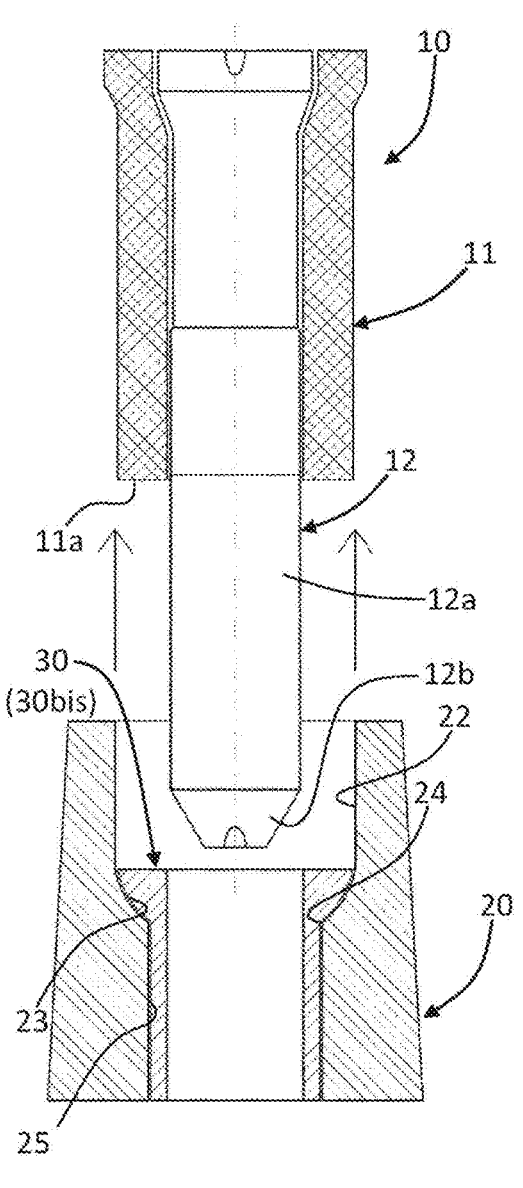

The slide 4 is thereafter operated for causing recession of the punch assembly 10, as may be seen in FIG. 13. It should be noted that the deformed material of the slug 30 (or 30bis) is well gripped within the die assembly 20, which avoids any risks of rising of the piece along the cavity 21. Moreover, in order to prevent this problem, as already mentioned, the portion 12a of the punch 12 can conveniently have a slightly conical shape in order to facilitate sliding-out thereof from the hole of the deformed slug 30 (or 30bis). The punch 12 may possibly be provided with a coating designed to improve resistance to wear thereof, and this coating can possibly be of aid in reducing friction and facilitating exit of the punch itself from the deformed slug. If this were not sufficient, as has been said, the press 2 can be provided with a suitable synchronized-extraction system on the side of the punch assembly. For this purpose, for example, the thrust bushing 11 can be mounted on a movable plate or support that, during the step of return of the slide 4 and of the punch 12, is kept pushed together with the bushing 11 itself for a short stretch by means of a known cam mechanism integrated in the press 2.

Figure 14:
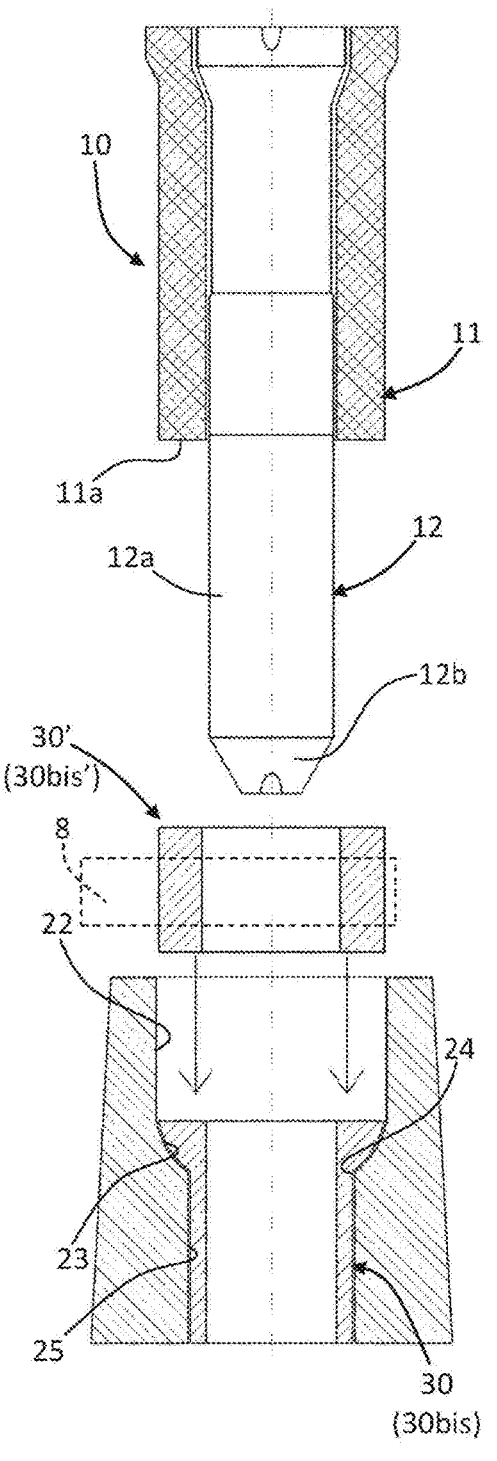
Figure 15:
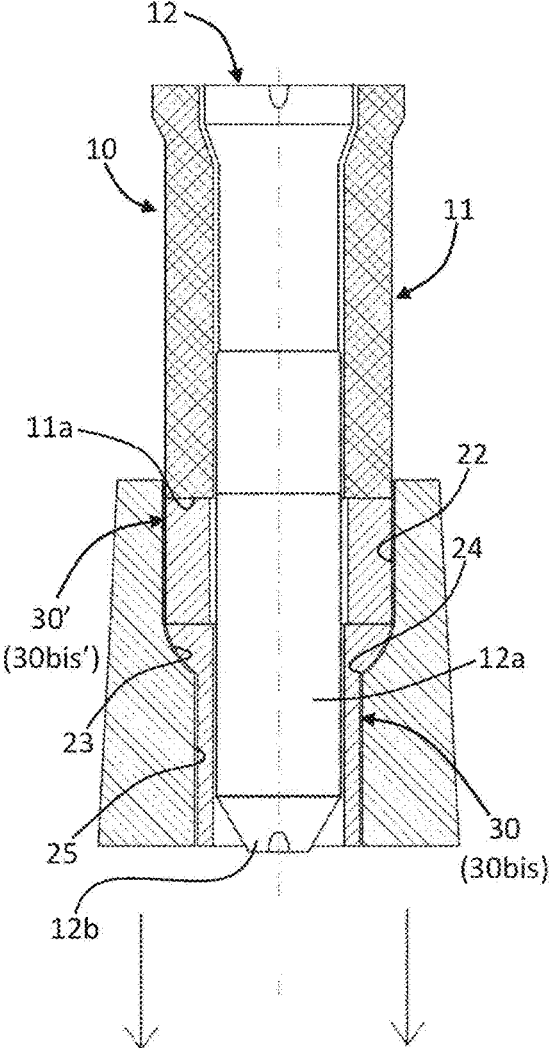

At this point, the manipulator system 8 positions a subsequent slug, designated by 30' (or 30bis') in FIG. 14, at the die assembly 20 in order to cause insertion thereof into the receiving region 22 in combination with the bushing 11, in a way similar to what has been described previously. This condition is illustrated in FIG. 15.

The punch assembly 10 is subsequently brought by the slide 4 to the bottom dead centre, as may be seen in FIG. 16, causing both partial deformation of the subsequent slug 30' (or 30bis') and the final deformation of the preceding slug 30 and its expulsion from the die assembly 20, through the region 25.

In particular, the bushing 11 now pushes downwards the subsequent slug 30' (or 30bis'), the lower face of which exerts a corresponding pressure on the part of material of the preceding slug 30 (or 30bis) that still occupies the region 23. As the assembly 10 progressively advances, the material constituting the subsequent slug 30' (or 30bis') replaces, within the regions 23-25 of the cavity 21, the material of the preceding slug 30 (or 30bis). The latter is forced to advance along the cavity 21, completing its own reduction forwards by completely passing through the region 24, and then passes into the region 25 and exits from the assembly 20 in the form of a blank 40 (or 40bis). The blank 40 (or 40bis) can then drop—for example through passage 2a of FIG. 1—into the discharge area 7.

The steps described previously with reference to the FIGS. 10-16 are those regarding start of the process: consequently, after a third recession of the punch assembly 10, a third slug will be introduced into the receiving region 22 of the die assembly 20. Following upon subsequent advance of the assembly 10, the aforesaid third slug will push the second slug 30' (or 30bis'), already partially deformed, to obtain a new blank 40 (or 40bis), and so forth for the further slugs and further blanks. For the purposes of start of production it may be advisable to reject the first deformed piece 40 (or 40bis) that leaves the die assembly 20 since it is in effect in a condition different from all the subsequent pieces (not encountering, during forward extrusion, any previous obstacle/piece).

As already explained, the blanks 40 (or 40bis) exiting the press 2 are then subjected to finishing, with operations in themselves known in the sector of the production of rolling bearing rings, or of the production gears, or of the production of piston pins and bushings, which are irrespective of the aims of the present invention. As already mentioned, as a result of the particular process described, the upper face 41a of the blank 40 (FIG. 3) or 40bis (FIG. 3bis) has a slightly concave surface, whereas the lower face 41b (FIG. 3 or FIG. 3bis) has a slightly convex surface. With a view to reducing the irregularity of the upper face 41a of the blank 40 or 40bis it is advisable to use in the area-reducing region 23 a conical profile (FIGS. 5 and 7) with an inclination indicatively comprised between 10° and 20°, preferably approximately 15°, instead of using a concave curved profile (FIG. 6). In order to eliminate the aforesaid surface irregularity of the faces 41a and/or 41b, the blanks 40 or 40bis can be levelled, in particular by means of traditional turning.

The cold-deformation technique proposed enables proper sliding of the material in an axial direction, and perfect filling of the regions 23-24 of the die assembly 20, and thus makes it possible to provide a blank of high mechanical strength and with very precise tolerances, to be sent on to the subsequent finishing steps, using a decidedly contained amount of thrust. The steel is deformed beyond the point of elastic resistance to obtain blanks with high sturdiness (clearly higher than what can be obtained via hot-forging or traditional turning), with a high sturdiness-to-weight ratio and an optimal flow of the fibres (unbroken grain flow).

Practical tests conducted by the inventor, using the process described previously, have enabled cold forming of ring blanks to be obtained having a high geometrical precision and considerable mechanical reliability, with outer diameters comprised between 20 and 100 mm, with thicknesses of from 3 to 25 mm (rings for bearings) or of from 3 to 35 mm (ring for gearwheels), and lengths of from 20 to 75 mm (rings for bearings) or of from 50 to 150 mm (rings for gearwheels), using annealed 100Cr6 steel (rings for bearings) or case-hardening steel, in particular 16MnCr5 or 20MnCr5 (rings for gearwheels). The process described may, in any case, be used also for obtaining ring blanks that have dimensions different from the ones tested.

In the same way, the process described previously has enabled cold forming of tubular connection-member blanks to be obtained having a high geometrical precision and considerable mechanical reliability, with outer diameters comprised between 20 and 80 mm, with thicknesses of from 3 to 30 mm and lengths of from 50 to 150 mm, using case-hardening steel (in particular, 16MnCr5). The process described may, however, be used also for obtaining tubular member blanks that have dimensions different from the ones tested, also using different steels according to the type of blank to be obtained (for example, a induction-hardening steel for bushings for catenaries or a low-alloy steel for bushings for vibration dampers).

FIG. 17 illustrates, via a simplified block diagram, a preferred sequence of a plurality of steps of a process according to the invention. Block I illustrates the step of supply and feed of a starting tube T towards a separation station, where the tube itself is divided into slugs 30 or 30bis, as per step II. The slugs are then loaded individually into the die assembly 20, as per step III, for the purposes of subsequent cold deformation, via the assemblies 10 and 20, as per step IV. This is followed by a step of discharging the blank 40 or 40bis.

As has been seen, preferentially, if necessary, the various steps I-V can be implemented in one and the same apparatus. Step II may for example be provided by a shearing station (8) integrated on the same press (2) which is prearranged for carrying out cold deformation of the slugs, as per step IV. This press (2) can be conveniently provided with a system (100) for supply and feed of the tube to be sheared, as per step I, with a manipulator system (8) for loading of the individual sheared slugs into the die assembly, as per step III, and with a system (7) for removal of the blanks from the press (2), as per step V. As already mentioned, the apparatus or the press is conveniently equipped with a control system CS, preferably prearranged for synchronizing, or managing in a co-ordinated way, the various operations referred to in steps I-V.

From the foregoing description the characteristics of the present invention emerge clearly, as likewise do its advantages.

Of course, the details of construction and the embodiments of the invention may vary widely with respect to what has been described and illustrated herein by way of example, without thereby departing from the scope of the invention as defined in the ensuing claims.

In the example described and illustrated previously, it has been considered that at each cycle of the apparatus 1 after the first, the slug 30 (or 30bis) partially contained in the regions 23-25 of the assembly 20 is expelled from the cavity 21. It is, however, clear that the axial dimension of the region 25 could be such that, with the second cycle of the apparatus 1, the aforesaid slug 30 (or 30bis) will still be within the region 25, or only partially outside the cavity 21, then to be expelled completely following upon the third cycle, and so forth for the subsequent cycles of the apparatus.

In the example provided, the apparatus 1—i.e., the press 2—is configured so as to integrate a station 9 for bench-shearing of the tube T, but this does not constitute an essential characteristic. In possible variant embodiments, in fact, the tube T could be divided into the slugs 30 or 30bis by a cutting station or else a shearing station. Moreover, the step of bench-shearing, or cutting, or shearing could be obtained in a purposely provided apparatus distinct from the press 2, then envisaging a system for transfer or loading of the slugs 30 or 30bis on the press itself, according to automation modalities in themselves known. In the case of cutting and shearing, the slugs can be subjected to a process of peening in order to eliminate possible residual burrs.

The apparatus according to the invention may be provided in the form of a production line, where the operations described are carried out by corresponding machine tools connected together by means of a system for feeding or conveying the tubes, slugs, and blanks, respectively.

The invention claimed is:

1. A process for producing rolling-bearing ring blanks made of bearing steel, the process comprising the steps of:

i) providing a hot-rolled tube made of bearing steel and of irregular inner and outer diameters, irregular wall thickness, or irregular concentricity between said diameters;

ii) dividing the hot-rolled tube into a plurality of bearing steel slugs each having an axial through hole, each bearing steel slug retaining at least one of the irregular inner and outer diameters, irregular wall thickness, and irregular concentricity of the hot-rolled tube;

iii) supplying the bearing steel slugs to a die assembly of a cold-forming station without any preliminary machining operations, the cold-forming station also including a punch assembly;

iv) subjecting the bearing steel slugs to contained forward extrusion through the die assembly, wherein a thrust imparted by a pushing member of the punch assembly on a subsequent bearing steel slug causes passage of a preceding bearing steel slug through an axial through cavity of the die assembly and cold deformation thereof into a rolling-bearing ring blank, while a restraining member of the punch assembly occupies the axial through hole of the subsequent bearing steel slug and at least part of the axial through hole of the preceding bearing steel slug.

2. The process according to claim 1, wherein the bearing steel is an annealed bearing steel.

3. The process according to claim 1, wherein the bearing steel has a tensile strength not lower than 65 Kg/mm$^2$.

4. The process according to claim 1, wherein the bearing steel is 100Cr6 steel.

5. The process according to claim 1, wherein the bearing steel is an annealed bearing steel and the bearing steel has a tensile strength not lower than 65 Kg/mm$^2$.

6. The process according to claim 1, wherein one of the hot-rolled tube and the bearing steel slugs is subjected to a phosphating process prior to step iii).

7. The process according to claim 1, wherein after step iv) at least one end face of the rolling-bearing ring blank is subjected to a levelling operation.

8. The process according to claim 1, wherein steps iii) and iv) comprise the operations of:

a) setting the preceding bearing steel slug in a receiving region of the axial through cavity of the die assembly, b) causing an axial approach between the punch assembly and the die assembly in such a way that:

b1) the pushing member causes a thrust on the preceding bearing steel slug, at the start of said thrust a first part of an elongated-body portion of the restraining member extending in the axial through hole of the preceding bearing steel slug and a second part of the elongated-body portion extending in an area-reducing region and a forming region of the axial through cavity of the die assembly, b2) the pushing member subsequently pushes the preceding bearing steel slug from the receiving region towards the forming region, passing through the area-reducing region, wherein, at the end of said axial approach, the preceding bearing steel slug has undergone deformation, with a respective upper part that engages the area-reducing region not occupied by said first part of the elongated-body portion, and a respective lower part that engages at least one portion of the forming region not occupied by said second part of the elongated-body portion;

c) causing an axial recession between the punch assembly and the die assembly;

d) setting the subsequent bearing steel slug at the receiving region;

e) causing a further axial approach between the punch assembly and the die assembly in such a way that the pushing member forces the subsequent bearing steel slug from the receiving region towards the forming region, with at least one part of the elongated-body portion of the restraining member that extends in the axial through hole of the subsequent bearing steel slug, and another part of the elongated-body portion that engages at least partially the axial through hole of the preceding bearing steel slug, the subsequent bearing steel slug thus pushing the preceding bearing steel slug so that also the upper part of the preceding bearing steel slug passes through the forming region and wherein, at the end of said further axial approach, the subsequent bearing steel slug has undergone deformation with a respective upper part that engages the area-reducing region not occupied by said at least one part of the elongated-body portion, and a respective lower part that engages at least one portion of the forming region not occupied by said another part of the elongated-body portion, f) repeating operations c-e for a number of subsequent bearing steel slugs.

9. The process according to claim 1, wherein step iii) comprises positioning individually each bearing steel slug in a position corresponding to the axial through cavity of the die assembly.

10. The process according to claim 9, wherein:

step ii) is carried out in a separation station, in which the hot-rolled tube is subjected to one from among bench-shearing, cutting or shearing; and a steel bearing slug that has been separated in the separation station is picked up and transferred directly to said position corresponding to the axial cavity of the die assembly in a manner synchronized with an actuation of the cold-forming station.

11. The process according to claim 1, wherein step ii) is carried out in a separation station, in which the hot-rolled tube is subjected to one from among bench-shearing, cutting or shearing.

12. The process according to claim 11, wherein the separation station is a shearing station having a movable shear and a fixed shear.

13. The process according to claim 11, wherein step iii) comprises transferring directly each bearing steel slug from the separation station to the axial through cavity of the die assembly.

\* \* \* \* \*